Dec. 3, 1957 H. W. SIGWORTH 2,814,935
HOT GAS ENGINE
Filed Jan. 18, 1954 4 Sheets-Sheet 1

INVENTOR.
HARRISON W. SIGWORTH

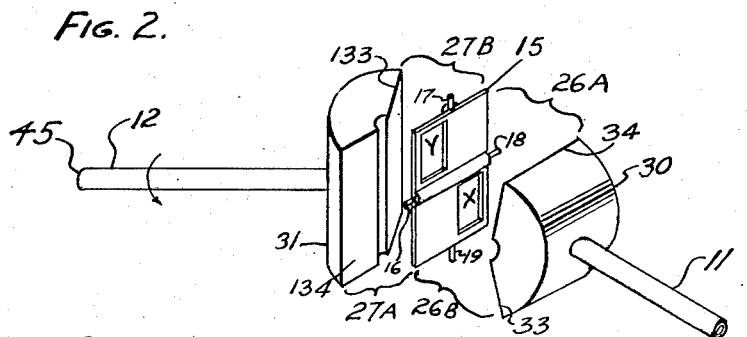
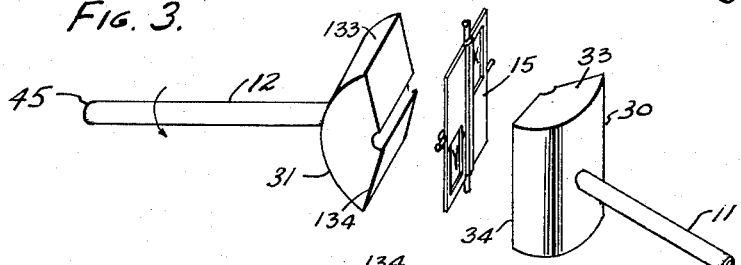
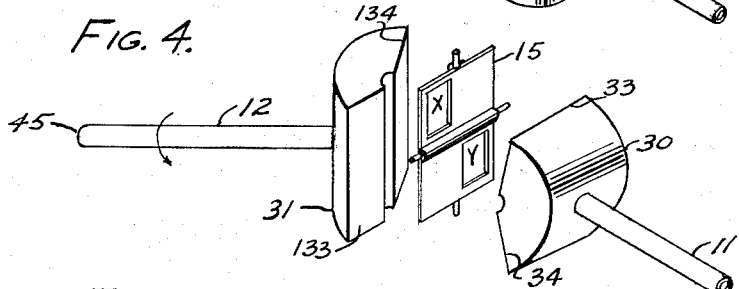
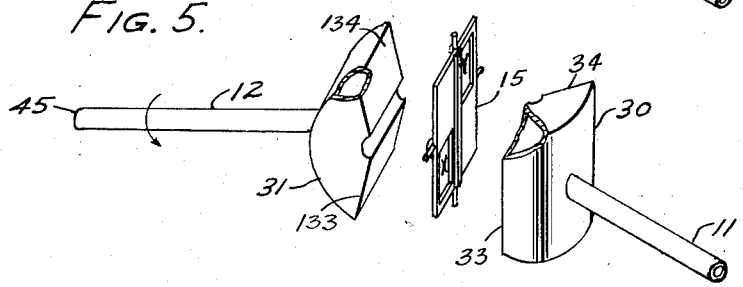

INVENTOR.
HARRISON W. SIGWORTH

Dec. 3, 1957    H. W. SIGWORTH    2,814,935
HOT GAS ENGINE

Filed Jan. 18, 1954    4 Sheets—Sheet 4

INVENTOR.
HARRISON W. SIGWORTH

United States Patent Office 2,814,935
Patented Dec. 3, 1957

2,814,935
HOT GAS ENGINE

Harrison W. Sigworth, El Cerrito, Calif.

Application January 18, 1954, Serial No. 404,423

9 Claims. (Cl. 62—136)

The present invention relates to hot gas engines, more particularly to hot gas engines adapted to convert selectively heat and work by compressing and expanding gas within a closed system, and has for an object the provision of a simplified form of apparatus including cylinder means for receiving a pair of pistons oscillatable with respect to each other. Said apparatus utilizing a closed system for the operating gas including a pair of working chambers for receiving said pistons and having heat regenerating means therebetween, through which said operating gas passes in performing its work-heat cycle, and means for effecting heat exchange between said operating gas and a heat exchange medium.

In the design of hot gas engines adapted to convert selectively heat to work and vice-versa, often referred to as air engines, it is necessary to provide at least a pair of pistons operating within a cylinder having a heat source, a heat regenerator and a heat receiver, with the heat regenerator interposed between first and second chambers of the cylinder. Engines of this type also require that the pistons be reciprocated substantially 90 degrees out-of-phase with respect to each other; that is, the pistons are interconnected mechanically through suitable linkages so that motion of one piston is always displaced from the motion of the other piston by one quarter of a cycle, or otherwise stated, one-half stroke. The reason for maintaining this angular displacement of the two pistons is described in Philips Technical Review, vol. 8, No. 5, May 1946. Briefly stated, this phase difference is utilized to permit the same operating gas to be alternately compressed and expanded within the closed system to produce selective conversion between work and heat.

While it has been known that the potential thermodynamic efficiency of hot gas or air engines is greater than internal and external combustion engines in present commercial use, this type of engine has not attained commercial success. One reason for such failure has been the complexity of the mechanical designs previously employed, but of even greater importance has been the rapid clogging and fouling of the active surface of the heat regenerators due to the deposition thereon of vapors and residues of the oil or other lubricants required between the friction surfaces within the working chambers of the engine.

In accordance with the present invention, the above-described difficulties have been overcome to high degree by provision of a simplified mechanical arrangement which is characterized by the working gas of the engine being maintained substantially free of vapor containing oil or other lubricants by location of the bearing surfaces externally of the working chambers of the engine and simplification of the apparatus by reduction in the number of moving parts to attain the desired phase-angle difference between the two pistons of the engine.

In a preferred form of the invention, the engine includes a Hooke's joint in which a pair of yoke members are drivingly connected together by a cross member, with the yokes mounted for rotation upon the opposed ends of shafts which are angularly disposed with respect to each other. A piston member is supported by each of the shafts and between the yoke in manner such that the piston will have an axis of oscillation with respect to the cross member substantially coincident with its corresponding yoke. Cylinder means including oppositely disposed chamber means for receiving the pistons is supported by the cross member. These chambers are formed substantially as half cylinders or spheres to receive wedge-shaped piston members. Means are provided for placing a portion of one of the chambers in communication with a portion of the other of said chambers which includes heat regenerating means through which the operating gas of the engine is passed in performing its work-heat cycle. In said preferred form of apparatus, the heat regenerator is included in a pair of passages through the cross member lying in diametrically opposed quadrants of the face of the cross. In operation of the apparatus either as a heat pump for supplying heat from, or rejecting heat to, a heat exchange medium, or as an engine for converting heat to work, there is further provided means for supplying heat to one of the chambers and means for rejecting heat from the other of the chamber means during rotation of the chambers.

Further objects and advantages of the present invention will become apparent from the following detailed description taken in conjunction with the accompanying drawings which form an integral portion of the attached specification.

In the drawings:

Fig. 2 is an exploded perspective view of the pistons, shafts and cross member illustrating the operating pistons and heat regenerator means as employed in the engine of Fig. 1.

Fig. 3 is a view similar to Fig. 2 with each of the parts rotated 90 degrees in a clockwise direction, as seen from the left side.

Fig. 4 is a view similar to Fig. 2 with each of the parts rotated 180 degrees in a clockwise direction, as seen from the left side.

Fig. 5 is a view similar to Fig. 2 with each of the parts rotated 270 degrees in a clockwise direction, as seen from the left side.

Figure 1:
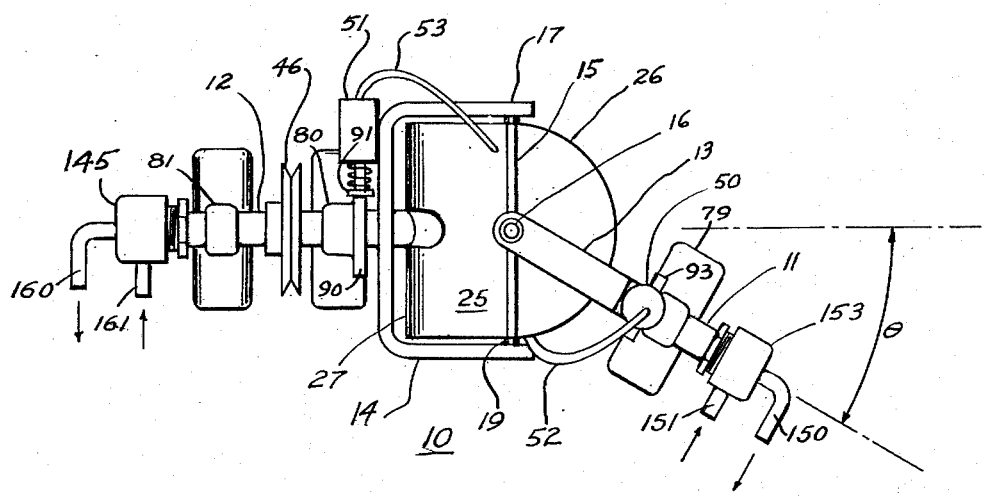
Fig. 1 is a plan view of a hot gas engine embodying the present invention which may be specifically used as a heat pump, and more particularly as a refrigeration unit.
Figure 6:
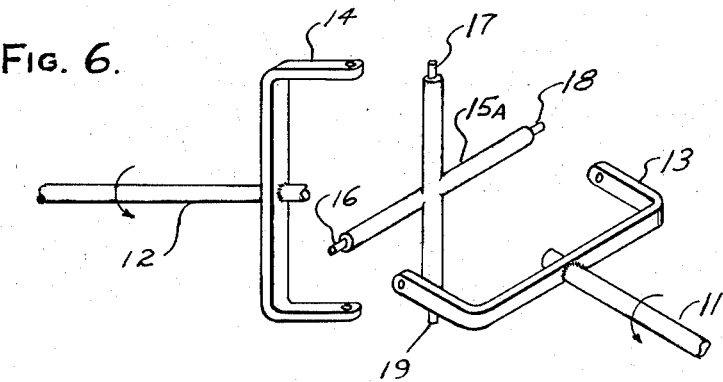
Fig. 6 is an exploded view of a Hooke's joint employed in carrying out the present invention and specifically illustrated to assist in the explanation of its cooperation with the other parts of the engine.

Referring now to the drawings, and in particular to Fig. 1 there is illustrated a preferred form of hot gas engine 10, constructed in accordance with the present invention, which in performing its work-heat cycle to convert either work to heat or heat to work, performs the mechanical motion of a universal or Hooke's joint. In the detailed description of the construction and operation of hot gas engine 10, the engine is illustrated and described as being operable as a heat pump, and more specifically as a refrigeration unit, such as may be applied to an air conditioning system, utilized for cooling the passenger compartment of an automobile.

Figure 7:
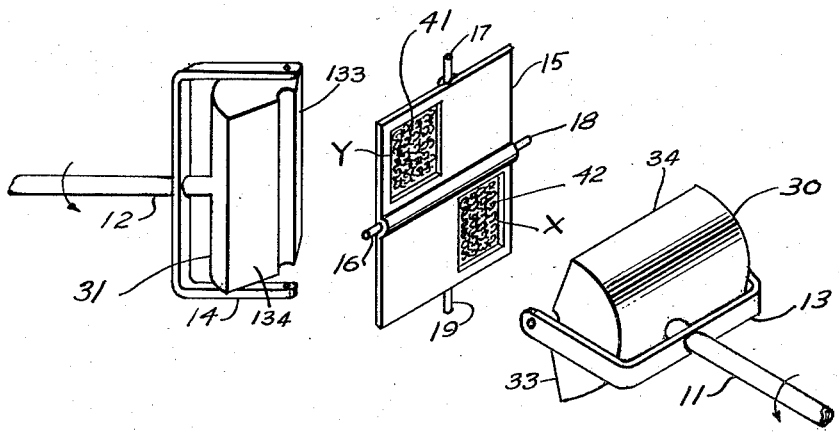
Fig. 7 is an exploded view of the pistons, yokes, shafts and cross members of an engine constructed in accordance with the present invention.

In accordance with the present invention hot gas engine 10 includes a pair of shafts 11 and 12 angularly disposed with respect to each other, and as shown in plan view Fig. 1, the operative portion of said engine is disposed at substantially the intersection of the angle between said shafts. Shafts 11 and 12 respectively supported by journal bearings 79, and 80, 81, form a complementary angle of $\theta$, as illustrated in Fig. 1, which may be adjusted to vary the compression ratio of the engine as will be more fully described below. Angularly disposed shafts 11 and 12 are each provided with a yoke member, 13 and 14 respectively, which may form the only frictional or load-carrying, bearing surfaces for the hot-gas working portions of said engine, when connected together through cross member 15, best seen in Fig. 7. As shown, cross member 15 is provided with four journal members 16, 17, 18 and 19 adapted to engage frictionless bearings, such as needle bearings, in the ends of yoke members 13 and 14.

Figure 8:
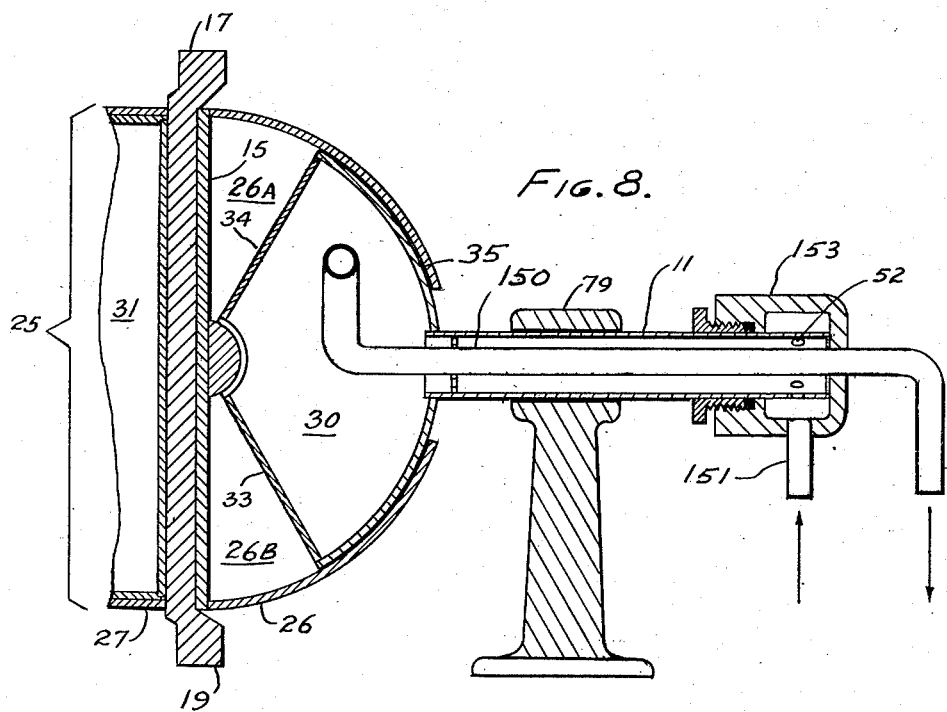
Fig. 8 is an elevation view, partially in section of the right-hand side of the engine illustrated in Fig. 1, particularly illustrating the heat exchange conduit arrangement.

Cross member 15, in addition to its function in providing bearing connections for the yokes and shafts wholly external to the working chambers of the engine, serves as the base member for cylinder means 25. In the present example cylinder means 25, as seen in Fig. 1 comprises a pair of half-cylinders 26 and 27 mounted on cross member 15 so that the axis of each of the cylinders is substantially identical with one of the two axes of cross 15, and at right angles to each other. Half-cylinders 26 and 27 are so formed that they enclose therewithin wedge-shaped piston members 30 and 31, respectively, mounted for rotation upon shafts 11 and 12. As more particularly shown in Figs. 2-6, pistons 30 and 31 are essentially axially extended segments of a solid cylinder. In the present embodiment, the included angle between the axially-extending, angular faces 33 and 34, is about 120 degrees, as shown in Fig. 8. It will be understood that the radius of curved portion 35 of piston members 30 and 31 will be such as to fit closely the inner surface of the working chambers, or cylinders 26 and 27.

Since the piston faces include an angle of only about 120 degrees, the working chambers on opposite sides of the faces together define a volume of 60 degrees. In accordance with the present invention, these working chambers 26A and 26B, as seen in Fig. 8, lie on opposite sides of piston 30 and are isolated from each other by said piston, but are respectively in continuous communication with the working chambers 27A and 27B, which lie on opposite sides of piston 31. Hereinafter the total volume in both chamber 26A and chamber 27A is referred to as chamber Y. The connecting means between chambers 27A and 26A is provided in the embodiment by a window between the two parts of chamber Y, formed in one quadrant of cross member 15 and identified as Y in Figs. 2-5. This window permits a heat regenerating means 41, essential for operation of said apparatus as a hot gas engine, to be positioned within and directly between working chambers 27A and 26A. Heat regenerator 41 in the window of chamber Y, and the corresponding regenerator 42 in the window of chamber X, formed by the total volume of chambers 26B and 27B, are preferably coils of metal having relatively high heat capacity, such as iron, formed in a matrix or nest so that when heated or cooled gas is passed therethrough, the gas will be transferred between chambers substantially isothermally.

Desirably the working gas for the hot gas engine is relatively dense to provide a greater mass of working substance. In the arrangement of Fig. 1, the working gas is preferably air and attains the desired density by being maintained at greater than atmospheric pressure to the working chambers by compressors 50 and 51, each mounted directly on yokes 13 and 14, respectively. As best illustrated by compressor 51, pumping action is produced by cam follower 91 engaging cam 90 which is secured against rotation by support upon bearing 80. With shaft 12 and yoke 14 rotating, cam follower 91 which is connected to the piston of compressor 51 is reciprocated by stationary cam 90. In the case of compressor 50, operating cam 93 is secured to the single bearing support 79 for shaft 11. The output of compressors 50 and 51 are respectively connected by flexible hoses 52 and 53 to the working chambers of the engine.

The operation of the engine as thus far described, when performing as a heat pump will be explained in conjunction with Figs. 2-5, wherein the 90 degree position of pistons 30 and 31 with respect to each other and cross 15 are illustrated when rotated through 360 degrees by shafts 11 and 12. It will, of course, be understood that cylinder means 25 has been removed to illustrate the operation of the pistons 30 and 31 within chambers 26 and 27 respectively, which are enclosed by cylinder means 25, as seen in Figs. 1 and 8. With the foregoing simplifications in mind, the following table identifies the changes in volume within chamber X (26B+27B) and chamber Y (26A+27A) when shafts 11 and 12 are rotated in a clockwise direction, as viewed from end 45 (Fig. 1) of shaft 12. As shown shaft 12 may be driven by pulley 46 through a V-belt by a motor, such as an automobile engine (not shown).

| Position as shown in Fig. | Chamber Y | Chamber X |
|---|---|---|
| 2 | Min. volume. | Max. volume. |
|   | Transfer to Left Side. | Transfer to Right Side. |
| 3 | Min. volume. | Max. volume. |
|   | Expansion. | Compression. |
| 4 | Max. volume. | Min. volume. |
|   | Transfer to Right Side. | Transfer to Left Side. |
| 5 | Max. volume. | Min. volume. |
|   | Compression. | Expansion. |
| 2 | Min. volume. | Max. volume. |

With the foregoing definitions and table in mind, an explanation of the operating cycle of the hot gas engine, constructed in accordance with present invention, will be given in which the engine is operated on a refrigeration cycle, such as would be employed in an air conditioning unit. Subsequently, explanations of the operation of the engine on a heating cycle and then as a work producing machine, will be set forth.

Considering now, that the hot gas engine is to be operated as a refrigerating unit, heat exchange fluid is supplied to the heat exchange surfaces of piston 30, faces 33 and 34, from a heat reservoir, such as the coolant water of an internal combustion engine (not shown) by way of annular space 150 (Fig. 8) within shaft 11, conduit 151 and inlet holes 52 in the end of shaft 11. The work supplied by the external power source through pulley 46, acting through cross 15, serves to increase the temperature of that portion of the working gas on the right side. Accordingly, with shaft 11 rotated in a counter-clockwise direction as viewed from the outer end, adjacent header coupling 153, the cycle of the gas will be as follows:

Under the condition between that shown in Figs. 3 and 4, gas in chamber X has been compressed to its minimum volume while substantially on the right side, thereby rejecting heat through the face of piston 30 which is the heat reservoir. After rotation of the engine through 90 degrees to the position illustrated in Fig. 5, the working gas has been moved at substantially constant volume to the left side, but residual heat generated in the gas during compression is stored in heat regenerator 42. Thus, the gas in going from the condition in Fig. 4 to that of Fig. 5 is at a substantially lower temperature, but still at minimum volume. In going to the condition shown in Fig. 2, after another 90 degrees of rotation, pistons 31 and 30 have oscillated so that the expansion of the gas takes place with the gas in chamber X predominantly on the left side. Accordingly, heat will be absorbed by the gas. In the present case, the heat exchange fluid in piston 31 is the most available source of heat, therefore the required heat is supplied to the gas and heat subtracted from the fluid within piston 31. This loss of heat may be utilized to obtain refrigeration of any desired type. In one useful application, the heat may be withdrawn from air circulated within the passenger compartment of an automobile, bus, truck or other vehicles.

Following expansion of the working gas, and the absorption of heat, during operation between the positions illustrated in Figs. 5 and 2, the engine is rotated through another 90 degrees during which time the expanded gas is transferred back to the right side through heat regenerator 42, which surrenders a portion of its stored heat to the gas. Subsequently, the gas is again compressed during the rotation of the pistons 30 and 31 and cross 15 to the position illustrated in Fig. 3, at which time the gas is again at the point set forth above, ready to repeat the cycle.

The cycle for the working gas contained in chamber Y is exactly as that described above for gas in chamber X, except that maximum volumes occur at the positions illustrated in Figs. 4 and 5, while minimum volumes are illustrated in Figs. 2 and 3; that is to say, at a phase difference of 180 degrees of rotation of the shafts with respect to the cycle of gas in chamber X. With this arrangement, it will thus be seen that two cycles of work of the gas is performed per revolution of the shafts.

When the engine is to be operated as a heat pump, rather than as a refrigerator, the heat reservoir is connected to piston means 30, instead of piston means 31. As thus connected, the cycle will be as follows:

The working gas in chamber X is compressed to minimum volume on the right side in going from the position shown in Fig. 3 to that of Fig. 4. The heat exchange fluid in piston 30 will absorb heat from the compressed working gas. While the heat exchange fluid is described as being a liquid, it will be apparent that it may also be a gas, such as air. When the engine is rotated from the position of Fig. 4 to that of Fig. 5, the compressed gas is cooled due to transfer through heat regenerator 42, and by heat absorption through the walls of piston 30, and moved to the left side. Upon further rotation from Fig. 5 to the position of Fig. 2, the gas is expanded and simultaneously absorbs heat from the heat exchange fluid in piston 31. Upon transfer back to the right side at substantially maximum volume, the working gas withdraws heat from the regenerator 42 in the window of chamber X in going from the position of Fig. 2 to that of Fig. 3. By thus maintaining the temperature of the gas, the work performed on the gas by compression during rotation of the engine from the position of Fig. 3 to that of Fig. 4, there is available an excess of heat which is transferable to the heat exchange fluid in piston 30. Thus, a complete cycle of the working gas is performed with piston means 31 maintained at an elevated temperature thereby resulting in a heat gain at piston means 30. The engine is therefore operable under these conditions as a heat pump.

From the foregoing description it will be seen that my invention contemplates the use of the hot gas engine to operate selectively as either a heat pump or refrigerator simply by connecting a heat reservoir either to piston means 30 or 31, or by reversing the direction of rotation of the drive shafts 11 and 12 without change in heat reservoir connections to pistons 30 and 31. Accordingly, there is provided by the present invention an exceedingly simple mechanism for supplying heat to or subtracting heat from any heat exchange medium. Under certain operating conditions the atmosphere may be used as the heat reservoir.

While the foregoing description has been made without mention of the volume of gas compressed or expanded, as noted above, the compression ratio of the engine, and the work performed on the gas are controlled by variation of the angle $\theta$ between shafts 11 and 12. With increase in angle, the compression ratio is increased both as to minimum and maximum volumes. This adjustability may be used to control the outlet temperature of the heat exchange fluid and provisions may be made for automatic control by variation of this angle in accordance with the outlet temperature. To quite a wide degree this control may be used irrespective of the temperature of the fluid supplied by the heat reservoir.

It will now be explained how an engine constructed in accordance with my invention may be operated as an engine capable of producing a net output of work available at one of the drive shafts, say shaft 12, and further available at pulley 46 for driving any suitable means.

Figure 9:
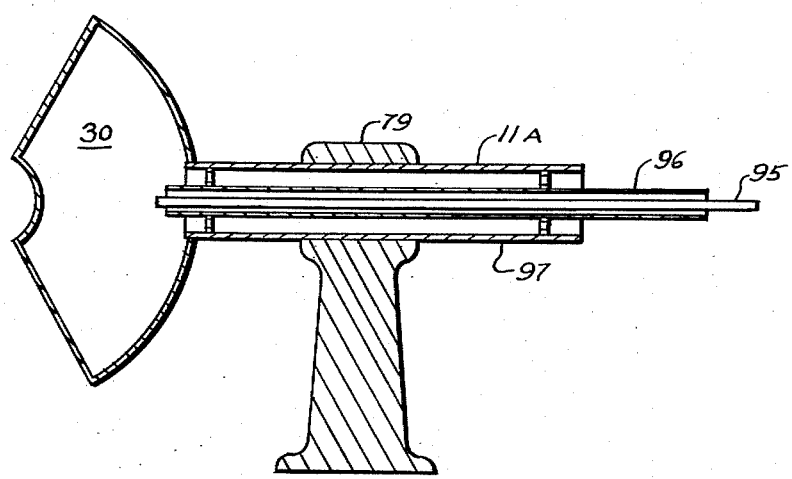
Fig. 9 is a cross-sectional elevation view similar to Fig. 8 in which one of the pistons has been connected to operate as engine capable of converting thermal energy to work.

If in place of heat exchange fluid being supplied to the interior of wedge, or piston 30, there is supplied a hot gas from a source of heat having a temperature of several hundred degrees above the ambient operating temperature of the engine, the operating gas in cylinder means 25 is expanded by said heat after compression by the oscillation of wedges 30 and 31 toward each other. One satisfactory method of supplying heat to the heat exchange surfaces of piston 30 is shown in Fig. 9 wherein fuel and air are respectively introduced through the concentric conduits 95 and 96 in shaft 11A which may be ignited while within piston 30, the combustion products being withdrawn through the outer annular passage 97. This arrangement is exceptionally satisfactory since the fuel-air mixture may thus be heated prior to introduction into piston 30.

With the expansion of the compressed gas while on the right side, rotation of cross member 15 and cylinder 25 will be effected and result in the expanded gas being transferred to the left side wherein the gas is cooled by contact with the heat exchange surface of piston 31. The gas is again compressed while on the left side, and returned to the right side to complete the work cycle. It will be understood that heat will be stored in the regenerating means 41 and 42 disposed in the windows X and Y of cross member 15.

Figure 10:
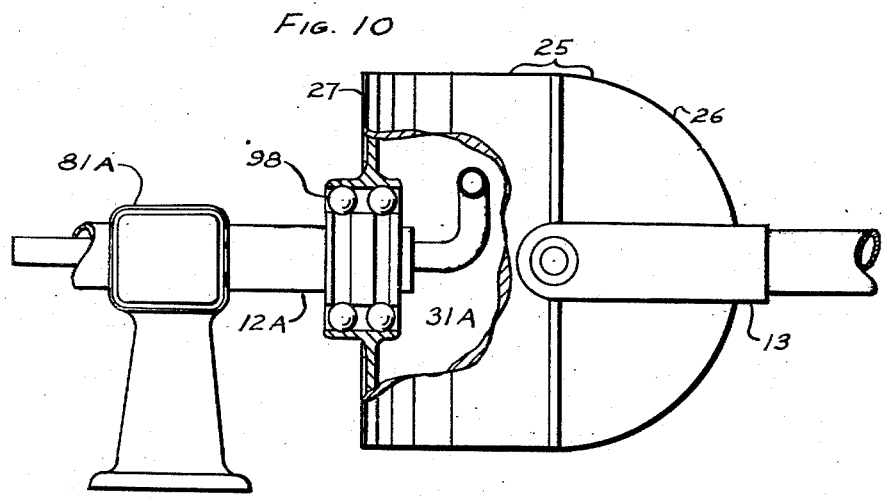
Fig. 10 is a side elevational view, partially in section, illustrating a modification of the hot gas engine wherein one of the shafts may be held stationary to support one side of the cylinder means through bearing means.

There is illustrated in Fig. 10 a modification of the forms of the hot gas engine illustrated in Figs. 1 to 9 wherein it is possible to rotatably support cylinder means 25 between a pair of shafts with only one of the shafts requiring rotation either to supply work to the engine or to extract work therefrom. As shown, shaft 12A is rigidly held by bearing support 81A and piston means 31A is rotatably supported on the end of shaft 12A by ball bearing 98. Thus, piston means 31A is free to rotate and cooperate with chamber means 27 in the same manner as in the previously described embodiments.

As stated hereinabove one of the primary defects of previously known engines operated on the hot gas, or air thermodynamic cycle has been the problem of coking the heat regenerating surfaces and the consequent decrease in operating efficiency of the engine. In accordance with my invention this problem is not present due to the external location of the bearing surfaces at pivot points, 16, 17, 18, and 19 which are all external to the hot gas operating chambers. By this arrangement, lubricant need not be used within the hot gas cylinders where it may be vaporized and deposited on the heat regenerating surfaces.

In operation of the hot gas engine in some applications, a liquid, such as mercury, may be heated to an elevated temperature to provide the desired heat source for piston means 31, but in other applications ambient conditions of the atmosphere may be used as the heat source.

While the preferred form of the hot gas engine constructed in accordance with the present invention includes the yokes and cross member as shown, in certain instances it is possible to operate the engine with these elements omitted.

From the foregoing description, it will be apparent that my hot gas engine takes advantage of the greater efficiency of the thermodynamic cycle of such engines over conventional engine cycles without the previously attendant problems in use of the hot gas engine cycle.

While various modifications and changes in the single embodiment of a hot gas engine illustrated and described in this specification will occur to those skilled in the art, all such modifications which fall within the scope of the appended claims are intended to be included therein.

I claim:

1. A hot gas engine comprising a pair of shafts, at least one of which is rotatable, said shafts being angularly disposed with respect to each other, a wedge-shaped piston member supported by the opposed ends of each of said shafts, cylinder means for receiving said piston members and supported for rotation with said piston members, wall means dividing said cylinder means into chambers and providing axes of oscillation for said piston members at substantially right angles with respect to each other, means for placing a portion of one of said chambers in communication with a portion of the other of said chambers, said last-named means including heat regenerating means through which the operating gas of said engine is passed in performing its work-heat cycle, means for supplying heat to one of said chambers and means for rejecting heat from the other of said chambers during rotation of said cylinder means.

2. A hot gas engine comprising a Hooke's joint, including a cross member and a pair of yoke members drivingly connected through said cross member by a pair of shafts angularly disposed with respect to each other, a piston member supported by each of said shafts between its respective yoke of said joint, said piston member having an axis of oscillation with respect to said cross member substantially coincident with its respective yoke, oppositely disposed cylinder means supported by said cross member forming chambers for receiving said piston members, means for placing a portion of one of said chambers in communication with a portion of the other of said chambers, said last-named means including heat regenerating means through which the operating gas of said engine is passed in performing its work-heat cycle, means for supplying heat to one of said chambers and means for rejecting heat from the other of said chambers during rotation of said cylinder means.

3. Apparatus for utilizing air thermodynamic cycles comprising cylinder means including a pair of piston receiving chambers, means connecting said chambers together in a substantially closed system for the operating gas, heat regeneration means in said connecting means, piston means within each of said chambers of said cylinder means, said piston means being oscillatable with respect to each other, means for oscillatably driving said piston means relative to each other to produce compression and expansion of said operating gas in said chambers, and means for effecting heat exchange between said operating gas and a heat exchange medium.

4. Apparatus for utilizing air thermodynamic cycles comprising a unitary cylinder means including a pair of piston receiving chambers, means connecting said chambers together in a substantially closed system for the operating gas, heat regeneration means in said connecting means, piston means within each of said chambers of said cylinder means, said piston means being oscillatable with respect to each other, means for oscillatably driving said piston means relative to each other at a constant phase angle difference to produce alternate compression and expansion of said operating gas in said chambers, and means for effecting heat exchange between said operating gas and a heat exchange medium.

5. Apparatus for utilizing an air thermodynamic cycle comprising a unitary cylinder means, means dividing said cylinder means into at least two piston receiving chambers, means connecting said chambers together in a substantially closed system for an expandable fluid operating on said cycle, heat regenerating means in said connecting means, oscillatable piston means within each of said chambers, shaft means for rotatably supporting each of said piston means, said cylinder means being rotatably supported between said piston means, means for driving said cylinder means to produce relative oscillation between said cylinder means and said piston means, and means for effecting heat exchange between said expandable fluid and heat exchange mediums within each of said piston means.

6. The combination in accordance with claim 5 in which said means for driving said cylinder means includes means for rotating at least one of said shafts.

7. The combination in accordance with claim 5 in which said means for driving said cylinder means includes means for supplying heat to the working medium in said cylinder means.

8. Apparatus for utilizing an air thermodynamic cycle comprising a unitary cylinder means, means dividing said cylinder means into at least two piston receiving chambers, means connecting said chambers together in a substantially closed system for an expandable fluid operating on said cycle, heat regenerating means in said connecting means, oscillatable piston means within each of said chambers, shaft means for rotatably supporting each of said piston means, said cylinder means being rotatably supported between said piston means, means for driving said cylinder means to produce relative oscillation between said cylinder means and said piston means, means for maintaining said expandable fluid at a super-atmospheric pressure during its work cycle, and means for effecting heat exchange between said expandable fluid and heat exchange mediums within each of said piston means.

9. Apparatus for utilizing air thermodynamic cycles wherein a working gas is successively compressed and expanded, comprising at least a pair of oscillatable pistons, said pistons being substantially formed as segments of a solid of revolution, cylinder means for receiving each of said piston means, means for oscillatably driving said pistons relative to each other at substantially a constant phase difference therebetween, means for connecting together at least a portion of each of said cylinder means including heat regenerating means through which the working gas utilized in said thermodynamic cycle is successively passed during expansion and compression, and means for effecting heat exchange between the working gas and a heat exchange medium.

References Cited in the file of this patent

UNITED STATES PATENTS

| | | |
|---|---|---|
| 1,240,862 | Lundgaard | Sept. 25, 1917 |
| 1,475,234 | Lundgaard | Nov. 27, 1923 |
| 1,730,580 | Lundgaard | Oct. 8, 1929 |
| 2,480,525 | Van Weenen | Aug. 30, 1949 |
| 2,657,553 | Jonkers | Nov. 3, 1953 |